(12) United States Patent
Wakrat et al.

(10) Patent No.: US 8,458,133 B2
(45) Date of Patent: Jun. 4, 2013

(54) COORDINATING SYNC POINTS BETWEEN A NON-VOLATILE MEMORY AND A FILE SYSTEM

(75) Inventors: Nir J. Wakrat, Los Altos, CA (US);
Daniel J. Post, Cupertino, CA (US);
Dominic Giampaolo, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 149 days.

(21) Appl. No.: 13/012,005

(22) Filed: Jan. 24, 2011

(65) Prior Publication Data

US 2012/0191664 A1    Jul. 26, 2012

(51) Int. Cl.
*G06F 17/30*    (2006.01)
*G06F 17/00*    (2006.01)

(52) U.S. Cl.
USPC ............ 707/648; 707/649; 707/645; 711/162

(58) Field of Classification Search
USPC ........................ 707/648, 649, 655; 711/162
See application file for complete search history.

(56) References Cited

U.S. PATENT DOCUMENTS

| | | | |
|---|---|---|---|
| 7,036,043 B2 * | 4/2006 | Martin et al. | 714/19 |
| 7,107,411 B2 | 9/2006 | Burton et al. | |
| 7,620,660 B2 * | 11/2009 | Kodavalla et al. | 1/1 |
| 7,647,360 B2 | 1/2010 | Kano | |
| 7,689,607 B2 * | 3/2010 | Oks et al. | 707/648 |
| 7,694,105 B2 | 4/2010 | Sanvido | |
| 2008/0307164 A1 | 12/2008 | Sinclair | |
| 2009/0271562 A1 | 10/2009 | Sinclair | |
| 2009/0313503 A1 | 12/2009 | Atluri et al. | |

\* cited by examiner

*Primary Examiner* — Yicun Wu
(74) *Attorney, Agent, or Firm* — Van Court & Aldridge LLP

(57) ABSTRACT

Systems and methods for coordinating sync points between a non-volatile memory ("NVM") and a file system are provided. In some embodiments, a file system can issue one or more commands to control circuitry of a NVM, which can indicate whether a transaction is journaled or non-journaled. This way, the control circuitry can maintain a list of journaled transactions and corresponding LBA(s). By keeping track of journaled transactions, the control circuitry can ensure that sync points are not prematurely erased during a garbage collection process. In addition, upon detecting device failure events, the control circuitry can roll back to sync points corresponding to one or more journaled transactions.

24 Claims, 8 Drawing Sheets

FIG. 2A

| USER DATA | METADATA |
|---|---|
| USER_DATA_x | a-1 | x |
| USER_DATA_y | n-1 | y |

FIG. 2B

| USER DATA | METADATA | |
|---|---|---|
| USER_DATA_x_1 | a | x | ← $t_1$
| USER_DATA_y_1 | n | [y, y*] | ← $t_2$

FIG. 2C

| USER DATA | METADATA | |
|---|---|---|
| USER_DATA_x_2 | a+1 | x | ← $t_3$
| USER_DATA_y_2 | n+1 | [y, y*] | ← $t_4$

COORDINATING SYNC POINTS BETWEEN A NON-VOLATILE MEMORY AND A FILE SYSTEM

BACKGROUND

NAND flash memory, as well as other types of non-volatile memories ("NVMs"), are commonly used for mass storage. For example, consumer electronics such as portable media players often include flash memory to store music, videos, and other media.

Some systems can provide metadata journaling in order to keep track of updates made to files and folders before committing those updates to a file system. Metadata journaling can facilitate system recovery from power failures, device failures, and other unexpected events.

Conventionally, a system may provide for metadata journaling on top of a NVM device. While this may provide some data recovery capabilities, such a configuration may be unable to ensure data consistency in response to unexpected device failures. That is, after the system recovers from a device failure, the system may fall into an incoherent state where some portions of a file may contain old data and other portions of the file may contain updated data.

SUMMARY

Systems and methods are disclosed for coordinating sync points between a non-volatile memory ("NVM") and a file system. As used herein, a "sync point" can refer to the valid data states of one or more LBAs associated with a journaled transaction immediately prior to the start of the transaction. In particular, a non-volatile memory and a file system can have coordinated sync points such that a system can roll back to known valid states for specific transactions in case of device failure events.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIG. 2 shows graphical views of three blocks shown at various stages of a transaction in accordance with embodiments of the invention;

DETAILED DESCRIPTION OF THE DISCLOSURE

Systems and methods for coordinating sync points between a non-volatile memory ("NVM") and a file system are provided. As used herein, a "sync point" can refer to the valid data states of one or more LBAs associated with a journaled transaction immediately prior to the start of the transaction.

In some embodiments, the file system can issue one or more commands to a control circuitry of the system, where the commands can indicate whether a transaction is journaled or non-journaled. Using this information, the control circuitry can maintain a list of journaled transactions, where each entry of the list of journaled transactions can correspond to a particular journaled transaction and its corresponding LBA(s).

By keeping track of journaled transactions, the control circuitry can ensure that sync points are not prematurely erased during a garbage collection ("GC") process. For example, when the control circuitry determines that GC needs to be performed on the NVM, the control circuitry can search a block or super block to determine whether the block or super block includes a journaled transaction (e.g., based at least in part on the list of journaled transactions). If the block or super block includes a journaled transaction, the control circuitry can determine not to perform GC on the block or super block, but rather select a new block or superblock for GC.

In addition, upon detecting device failure events, the control circuitry can roll back to sync points corresponding to one or more journaled transactions. For example, after a device failure event has been detected in the system, the control circuitry can identify at least one journaled transaction. In addition, the control circuitry can locate a sync point for the identified transaction. Upon locating the sync point, the control circuitry can roll back the particular journaled transaction to the sync point.

In some embodiments, for journaled transactions, one or more markers can be programmed in a block along with other metadata. The markers can be used by the control circuitry to distinguish between journaled and non-journaled transactions.

Figure 1:
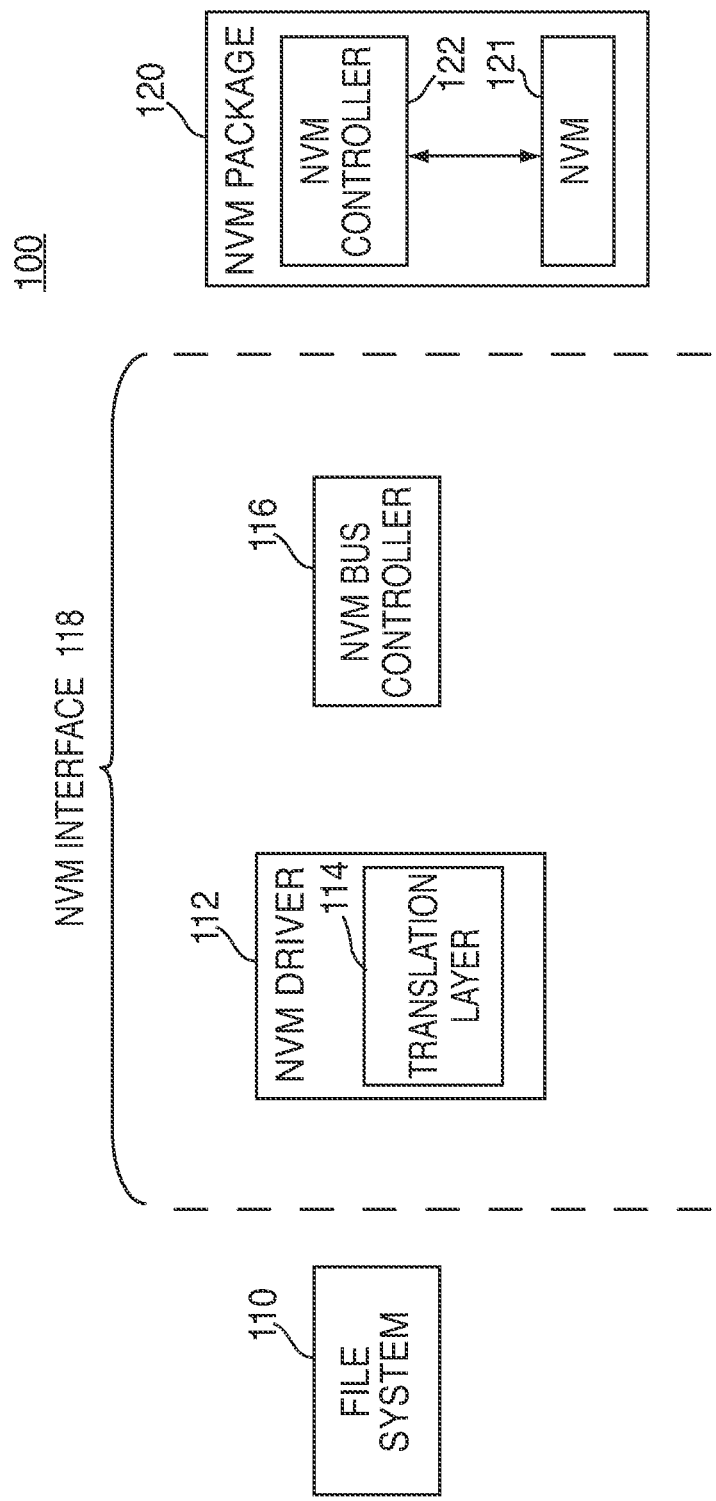
FIG. 1 shows an illustrative block diagram of a system in accordance with various embodiments of the invention.

FIG. 1 illustrates a block diagram of a combination of firmware, software, and hardware components of system 100 in accordance with an embodiment of the invention.

System 100 can include file system 110, NVM driver 112, NVM bus controller 116, and NVM package 120. In some embodiments, file system 110 and NVM driver 112 may be software or firmware modules, and NVM bus controller 116 may be a hardware module. Accordingly, in these embodiments, NVM driver 112 may represent the software or firmware aspect of NVM interface 118, and NVM bus controller 116 may represent the hardware aspect of NVM interface 118.

NVM package 120 can include NAND flash memory 121 based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), or any combination thereof.

NVM 121 can be organized into "blocks", which is the smallest erasable unit, and further organized into "pages", which can be the smallest unit that can be programmed or read. In some embodiments, NVM 121 can include multiple dies, where each die may have multiple blocks. The blocks from corresponding die (e.g., blocks having the same position or block number) may form "super blocks". Each memory location (e.g., page or block) of NVM 121 can be addressed using a physical address (e.g., a physical page address or physical block address).

In some embodiments, NVM package 120 can be a managed NVM package. As used herein, a "managed NVM" may refer to a memory device or package that includes a NVM controller configured to perform at least one memory management function for a non-volatile memory. For example, as shown in FIG. 1, NVM controller 122 can perform memory management functions for any suitable number of blocks of NVM 121.

NVM controller 122 may include any suitable combination of processors, microprocessors, or hardware-based components (e.g., ASICs). For example, NVM controller 122 may share the responsibility of managing and/or accessing the physical memory locations of NVM 121 with NVM driver 112. Alternatively, NVM controller 122 may perform substantially all of the management and access functions for NVM 121.

Memory management and access functions that may be performed by NVM controller 122 can include issuing read, write, or erase instructions and performing wear leveling, bad block management, garbage collection, logical-to-physical address mapping, SLC or MLC programming decisions, applying error correction or detection, and data queuing to set up program operations.

Persons skilled in the art will appreciate that NVM package 120 may alternatively be a raw NVM package. As used herein, a "raw NVM" may refer to a memory device or package that may be managed entirely by a host controller external to the NVM package. In such embodiments, a host controller (not shown in FIG. 1) of system 100, which can be used to control system operations through use of one or more processors, can also be used to control and manage the memory locations of NVM 121 and the data stored therein. For simplicity, components of a system that can manage a NVM (e.g., portions of the host controller and NVM interface 118 or NVM controller 122) may sometimes be referred to simply as a "control circuitry".

File system 110 can include any suitable type of file system, such as a File Allocation Table ("FAT") file system or a Hierarchical File System Plus ("HFS+"). File system 110 can manage file and folder structures required for system 100 to function.

File system 110 may provide write and read commands to NVM driver 112 when an application or operating system requests that information be read from or stored in NVM 121. Along with each read or write command, file system 110 can provide a logical address indicating where the data should be read from or written to, such as a logical page address or a logical block address ("LBA") with a page offset.

File system 110 may provide read and write requests to NVM driver 112 that are not directly compatible with NVM package 120. For example, the LBAs may use conventions or protocols typical of hard-drive-based systems. A hard-drive-based system, unlike flash memory, can overwrite a memory location without first performing a block erase. Moreover, hard drives may not need wear leveling to increase the lifespan of the device. Therefore, NVM interface 118 can perform any functions that are memory-specific, vendor-specific, or both to handle file system requests and perform other management functions in a manner suitable for NVM package 120.

NVM driver 112 can include translation layer 114. In some embodiments, translation layer 114 may be or include a flash translation layer ("FTL"). On a write command, translation layer 114 can map the provided logical address to a free, erased physical location on NVM 121. On a read command, translation layer 114 can use the provided logical address to determine the physical address at which the requested data is stored. Because each NVM may have a different layout depending on the size or vendor of the NVM, this mapping operation may be memory and/or vendor-specific. Translation layer 114 can perform any other suitable functions in addition to logical-to-physical address mapping. For example, translation layer 114 can perform any of the other functions that may be typical of flash translation layers, such as garbage collection and wear leveling.

NVM driver 112 may interface with NVM bus controller 116 to complete NVM access commands (e.g., program, read, and erase commands). Bus controller 116 may act as the hardware interface to NVM package 120, and can communicate with NVM package 120 using the bus protocol, data rate, and other specifications of NVM package 120.

NVM interface 118 may manage NVM package 120 based on memory management data, sometimes referred to herein as "metadata". The metadata may be generated by NVM driver 112 or may be generated by a module operating under the control of NVM driver 112. For example, metadata can include any information used for managing the mapping between logical and physical addresses, bad block management, wear leveling, ECC data used for detecting or correcting data errors, markers used for journaling transactions, or any combination thereof.

The metadata may include data provided by file system 104 along with the user data, such as a logical address. Thus, in general, "metadata" may refer to any information about or relating to user data or used generally to manage the operation and memory locations of a non-volatile memory. NVM interface 118 may be configured to store metadata in NVM 121.

In some embodiments, system 100 can provide for transaction journaling. As used herein, "transaction journaling" can refer to a process that is used to keep track of particular transactions in system 100 such that a consistent state can be achieved after a device failure event (e.g., a power failure event or a system crash).

Conventionally, a system may be unable to ensure data consistency in response to unexpected device failures. For example, a device failure event may occur when a file system is in the middle of a file or folder structure update. During a boot-up process following the device failure event, the file or folder structure may reach an inconsistent state because the system is unable to determine a valid data state corresponding to the file or folder structure.

In order to ensure data consistency, system 100 can provide for atomicity in one or more transactions, such that in response to a device failure event, data (e.g., user data and metadata) associated with journaled transactions can be rolled back to a valid state. In particular, system 100 can provide coordinated sync points between file system 110 and NVM package 120 in order to achieve consistent states through all layers of system 100 (e.g., through the application or operating system layer, the file system layer, and the NVM layer).

For example, when an application or operating system initiates a transaction on one or more files or folder structures, file system 110 can detect the transaction, and can issue one or more commands to a control circuitry. In some embodiments, the one or more commands can be in the form of an application programming interface ("API") operation. An API can be any suitable interface that can allow a software program or module to interact with other software.

For instance, upon detecting a transaction, file system 110 (via NVM interface 118) can assign a transaction ID to the newly initiated transaction, and can issue a command (e.g., an API operation) to the control circuitry indicating that a transaction has been newly initiated. In some cases, the command may include the transaction ID as a parameter. For example, a BEGIN_TRANSACTION command associated with the newly initiated transaction can be issued to the control circuitry with the following format:

$$\text{BEGIN\_TRANSACTION(TRANSACTION\_ID);} \quad (1)$$

where TRANSACTION_ID corresponds to the transaction ID that has been assigned by file system 110 to the newly initiated transaction.

File system 110 can assign any suitable value to a transaction ID. In some embodiments, transaction IDs can be selected based on whether a particular transaction is a journaled transaction or a non-journaled transaction. For instance, if a transaction is a non-journaled transaction, the file system can assign a specific default value to the TRANSACTION ID. If, on the other hand, a transaction is a journaled transaction, the file system can assign a non-default value to the TRANSACTION ID.

Furthermore, if the application or operating system requests to write data for this transaction, file system 110 can issue, via NVM interface 118, a write command (e.g. an API operation) to the control circuitry with the following format:

$$\text{WRITE(USER\_DATA,LBA,AGE,TRANSACTION\_ID);} \quad (2)$$

where USER_DATA corresponds to the user data to be written, LBA corresponds to the one or more LBAs associated with the transaction, AGE corresponds to the age of the user data, and TRANSACTION_ID corresponds to the transaction ID of the transaction. In some cases, LBA, AGE, and TRANSACTION_ID can be metadata associated with the transaction. In addition to or instead of the parameters shown in (2), persons skilled in the art will appreciate that the WRITE command can include any other suitable parameters such as, for example, a counter, a buffer, and/or ECC data.

In response to receiving the WRITE command, control circuitry can program the user data and associated metadata to one or more memory locations of NVM 121. In addition, in response to receiving the BEGIN TRANSACTION command and the WRITE command, the control circuitry can update a list of journaled transactions. The list of journaled transactions can be used to keep track of pending journaled transactions, where each entry can include a journaled transaction and its corresponding LBA(s). The list of journaled transaction can be stored in volatile memory (not shown in FIG. 1) or non-volatile memory (e.g., NVM 121), and will be discussed in more detail in connection with the following figures.

In some cases, a particular transaction may be kept open for a period of time. Accordingly, over a period of time, file system 110 (via NVM interface 118) can issue multiple API operations (e.g., write or read commands) associated with the same transaction to control circuitry.

In addition, during a particular period of time, file system 110 can simultaneously handle multiple transactions. For example, file system 110 can detect a new transaction after issuing the WRITE command provided in (2). In response to detecting the new transaction, file system 110 can assign a new TRANSACTION ID to the transaction, and issue a corresponding command to the control circuitry.

Once the application or operating system has finished updating the file or folder structure, file system 110 can detect an end of the transaction and issue a corresponding command to the control circuitry. For example, file system 110, via NVM interface 118, can issue an end transaction command indicating that the transaction has ended with the following format:

$$\text{END\_TRANSACTION(TRANSACTION\_ID);} \quad (3)$$

In response to receiving the END_TRANSACTION command, the control circuitry can update the list of journaled transactions by removing the transaction and its associated LBA(s) from the list.

Referring now to FIGS. 2A-2C, graphical views of three blocks (e.g., blocks 200, 220, and 240) of a NVM (e.g., NVM 120 of FIG. 1) are shown at various stages of a transaction. Persons skilled in the art will appreciate that the memory locations where the user data and metadata are stored in blocks 200, 220, and 240 are merely illustrative. For example, in some embodiments, user data and corresponding metadata may be stored in the same memory locations (e.g., pages) of a block. In other embodiments, user data and corresponding metadata may be stored in different blocks. Persons skilled in the art will also appreciate that other types of metadata can also be stored in blocks 200, 220, and 240. For example, ECC data can be stored in one or more portions of blocks 200, 220, and 240.

As shown in FIG. 2A, block 200 may include data 204 and metadata 205 associated with a particular file or folder structure. In particular, metadata 205 can include LBA metadata 206 and age metadata 208, which can have values of x and a−1, respectively.

Moreover, as shown in FIG. 2A, block 200 may include data 210 and metadata 211 associated with another file or folder structure. In particular, metadata 211 can include LBA metadata 212 and age metadata 214, which can have values of y and n−1, respectively.

Referring now to FIG. 2B, at time $t_1$, file system (e.g., file system 110 of FIG. 1) via a NVM interface (e.g., NVM interface 118 of FIG. 1) can issue a begin transaction command and a write command to a control circuitry. For example, the following two commands may be issued to the control circuitry:

$$\text{BEGIN\_TRANSACTION(0);} \quad (4)$$

$$\text{WRITE(USER\_DATA\_x\_1,}x,a,0); \quad (5)$$

where TRANSACTION_ID has a value of 0, USER_DATA has a value of USER_DATA_x_1, LBA has a value of x, and AGE has a value of a. Thus, the file system may be writing to the same LBAs as LBAs previously stored in the NVM (e.g., LBA x).

In response to receiving the WRITE command, control circuitry can program user data (e.g., user data 222) to block 220. In addition, the control circuitry can program corresponding metadata to block 220. For example, as shown in FIG. 2B, the programmed metadata can include LBA metadata 224 and age metadata 226, which can have values of x and a, respectively.

At the same time, in response to receiving the BEGIN_TRANSACTION command, the control circuitry can determine if the TRANSACTION_ID associated with the BEGIN_TRANSACTION command indicates that the transaction is a journaled transaction (e.g., TRANSACTION_ID has a non-default value). Upon determining that the transaction is a journaled transaction, the control circuitry can update a list of journaled transactions by adding the TRANSAC- TION_ID and associated LBAs to the list. For example, Table 1 shows an illustrative list of journaled transactions after the list has been updated.

TABLE 1

| TRANSACTION_ID | LBA(s) |
|---|---|
| 0 | x |

At time $t_2$, the control circuitry can receive other commands from the file system. For example, the file system may initiate another transaction, and issue the following two commands to the control circuitry via the NVM interface:

$$BEGIN\_TRANSACTION(1); \qquad (6)$$

$$WRITE(USER\_DATA\_y\_1,[yy*],n,1); \qquad (7)$$

where TRANSACTION_ID has a value of 1, USER_DATA has a value of USER_DATA_y_1, LBA has a value of [y y*], and AGE has a value of n. Thus, although the file system is writing to some of the same LBAs as LBAs previously stored in the NVM (e.g., LBA y), the file system is also writing to new LBAs (e.g., LBA y*).

In response to receiving the WRITE command, the control circuitry can program user data (e.g., user data 228) to block 220. In addition, the control circuitry can program metadata associated with the write command to block 220. For example, as shown in FIG. 2B, the programmed metadata can include LBA metadata 230 and age metadata 232, which can have values of [y, y*] and n, respectively.

In response to receiving the second BEGIN_TRANSACTION command, the control circuitry can determine that the transaction is a journaled transaction, and add the newly initiated transaction to the list of journaled transactions. For example, Table 2 shows an illustrative list of the currently journaled transactions after the list has been updated.

TABLE 2

| TRANSACTION_ID | LBA(s) |
|---|---|
| 0 | x |
| 1 | y, y* |

Although only two transactions are shown in Table 2, persons skilled in the art will appreciate that the control circuitry can provide for the concurrent journaling of any suitable number of transactions.

Figure 3:
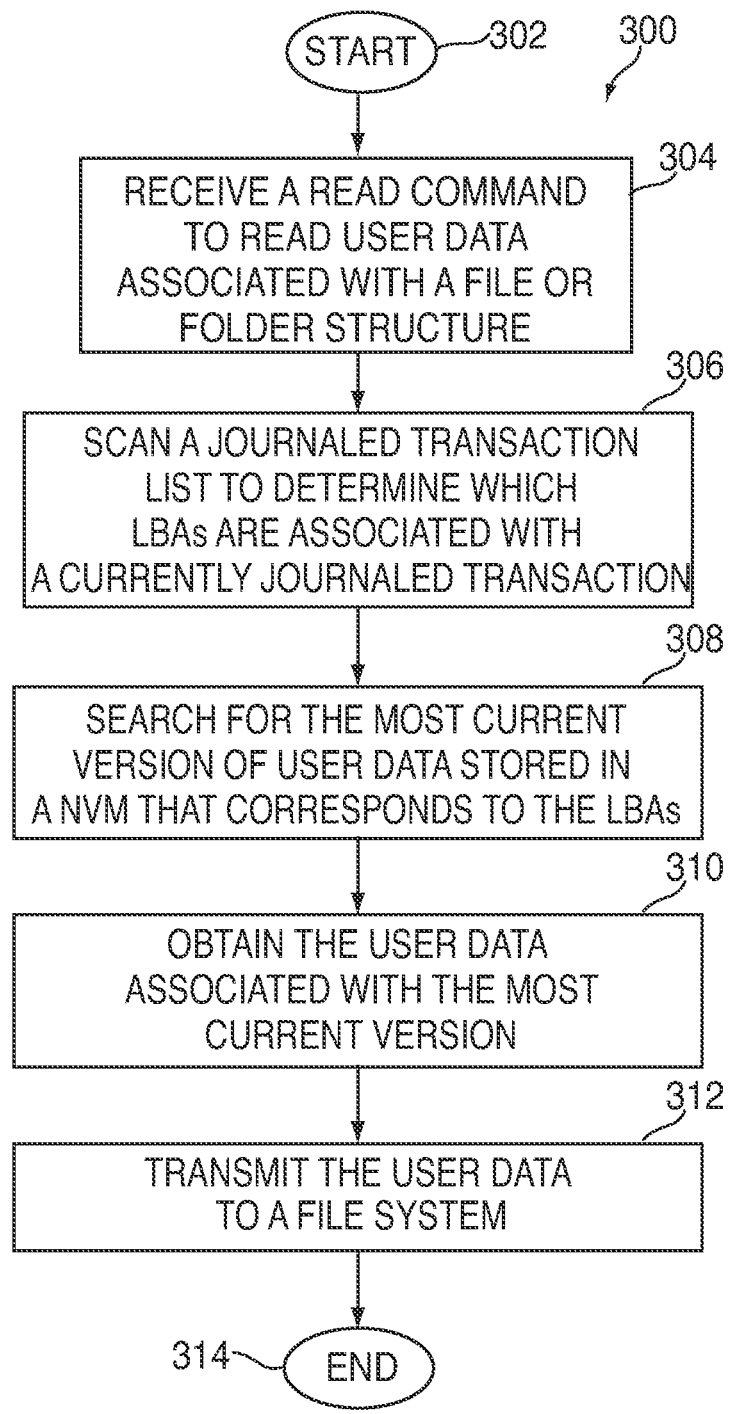
FIG. 3 shows a flowchart of an illustrative process for reading user data from a non-volatile memory in accordance with an embodiment of the invention.

Referring now to FIG. 3, a flowchart of illustrative process 300 is shown for reading user data from a NVM (e.g., NVM 121 of FIG. 1). The steps of process 300 can be executed by a control circuitry (e.g., portions of a host controller and NVM interface 118 of FIG. 1 or NVM controller 122 of FIG. 1) or by any other component or combination of components of an electronic device or system (e.g., system 100 of FIG. 1).

Process 300 can begin at step 302, where a file system (e.g., file system 110 of FIG. 1) may issue a read command to the control circuitry (via a NVM interface such as NVM interface 118 of FIG. 1) in order to perform a read operation on a particular file or a folder structure.

At step 304, the control circuitry can receive the read command to read user data associated with the file or folder structure. At step 306, the control circuitry can scan a journaled transaction list to determine which LBAs are associated with a currently journaled transaction. Any suitable approach can be used to scan the journaled transaction list such as, for example, a list traverse, hashing, or any other suitable algorithm.

For instance, referring now specifically to FIGS. 2A and 2B, in response to receiving a read command to read LBA x, the control circuitry can scan the journaled transaction list of Table 2 to determine that LBA x corresponds to a journaled transaction.

Continuing to step 308, the control circuitry can search for the most current version of user data stored in the NVM that corresponds to the LBAs. In some embodiments, the control circuitry can search for a version of the user data that has the youngest age. In the example shown in FIGS. 2A and 2B, for instance, the control circuitry can determine that the most current version of user data for LBA x is stored on block 220 of FIG. 2B (e.g., age a).

Then, at step 310, the control circuitry can obtain the user data associated with the most current version. For example, the control circuitry can obtain user data 222 of block 220, which can correspond to the most recently programmed user data associated with LBA x. At step 312, the control circuitry can transmit the user data to the file system (via the NVM interface). Process 300 can then end at step 314.

Referring back to FIG. 2C, at time $t_3$, the file system can issue (via the NVM interface) a write command to update the user data associated with TRANSACTION_ID 0. For example, the write command can have the following format:

$$WRITE(USER\_DATA\_x\_2,x,a+1,0); \qquad (8)$$

where user data has a value of USER_DATA_x_2, LBA has a value of x, AGE has a value of a+1, and TRANSACTION_ID has a value of 0.

In response to receiving this WRITE command, the control circuitry can program user data (e.g., user data 242) to block 240. In addition, the control circuitry can program metadata associated with the write command to block 240. For example, as shown in FIG. 2C, the programmed metadata can include LBA metadata 244 and age metadata 246, which can have values of x and a+1, respectively. Consequently, although the file system is writing new data to the same LBAs as before (e.g., LBA x), age metadata 246 has been changed to reflect that user data 242 is an updated version of user data 222 (FIG. 2B).

After issuing the write command, the file system may detect an end of the transaction for TRANSACTION_ID 0 (e.g., the application or the operating system may have finished updating the file or folder structure). In response to detecting the end of the transaction, the file system may issue an end transaction command for the transaction via the NVM interface. For example, the following command may be issued to the control circuitry:

$$END\_TRANSACTION(0); \qquad (9)$$

In response to receiving the END_TRANSACTION command, the control circuitry can update the list of journaled transactions by deleting TRANSACTION_ID 0 and its associated LBA(s) from the list. For example, Table 3 shows an illustrative list of the currently journaled transactions after the update.

TABLE 3

| TRANSACTION_ID | LBA(s) |
|---|---|
| 1 | y, y* |

At time $t_4$, the file system can issue a write command to update the user data associated with TRANSACTION_ID 1 via the NVM interface. For example, the $$\text{WRITE(USER\_DATA}\_y\_2, [yy*], n+1, 1); \quad (10)$$

where USER_DATA has a value of USER_DATA_y_2, LBA has a value of [y y*], AGE has a value of n+1, and TRANSACTION_ ID has a value of 1.

In response to receiving the WRITE command, the control circuitry can program user data (e.g., user data 248) to block 240. In addition, the control circuitry can program updated metadata associated with the write command in block 240. For example, as shown in FIG. 2C, the programmed metadata can include LBA metadata 250 and age metadata 252, which can have values of [y, y*] and n+1, respectively. Consequently, although the file system is writing new data to the same LBAs as before (e.g., LBAs y and y*), age metadata 252 has been changed to reflect that user data 248 is an updated version of user data 228 (FIG. 2B).

Figure 4:
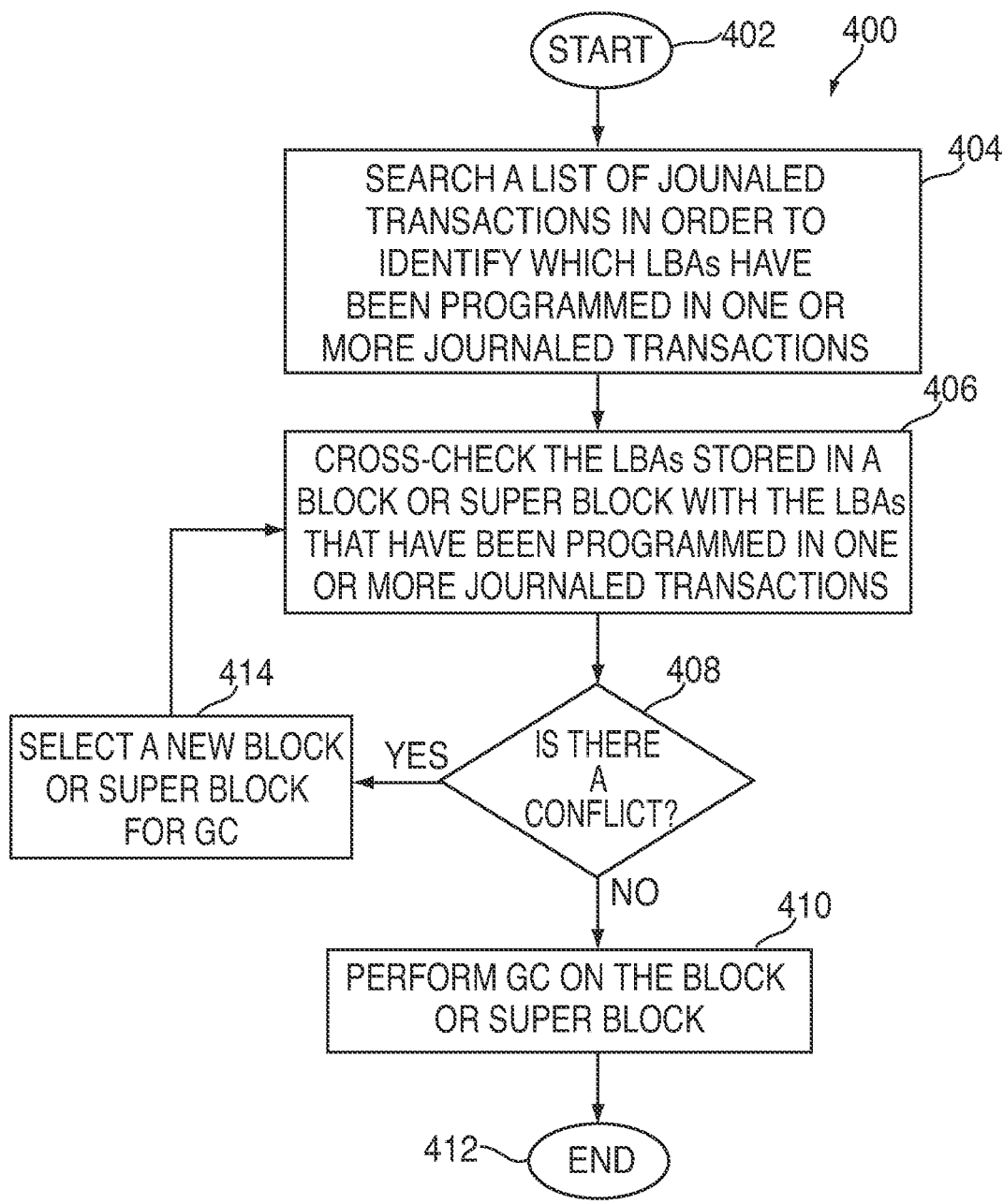
FIG. 4 shows a flowchart of an illustrative process for performing garbage collection on a non-volatile memory in accordance with an embodiment of the invention.
Figure 5:
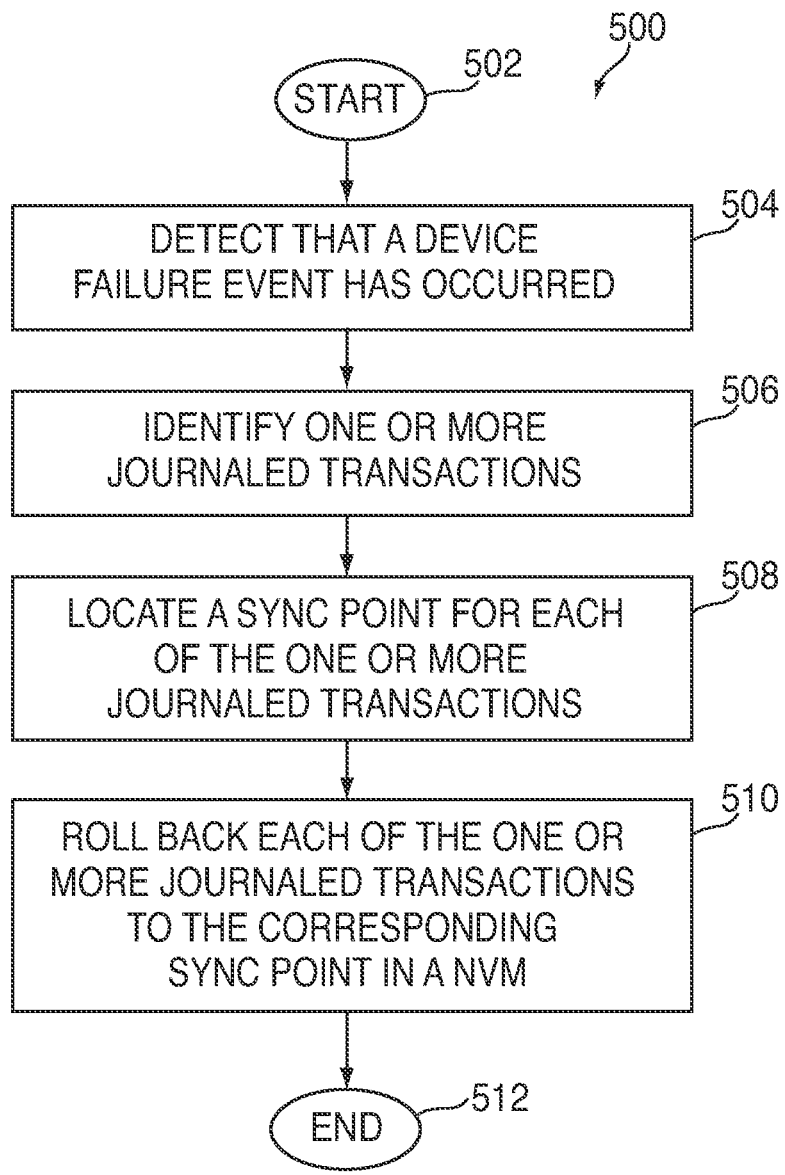
FIG. 5 shows a flowchart of an illustrative process for rolling back journaled transactions to one or more sync points on a non-volatile memory in accordance with an embodiment of the invention.
Figure 6:
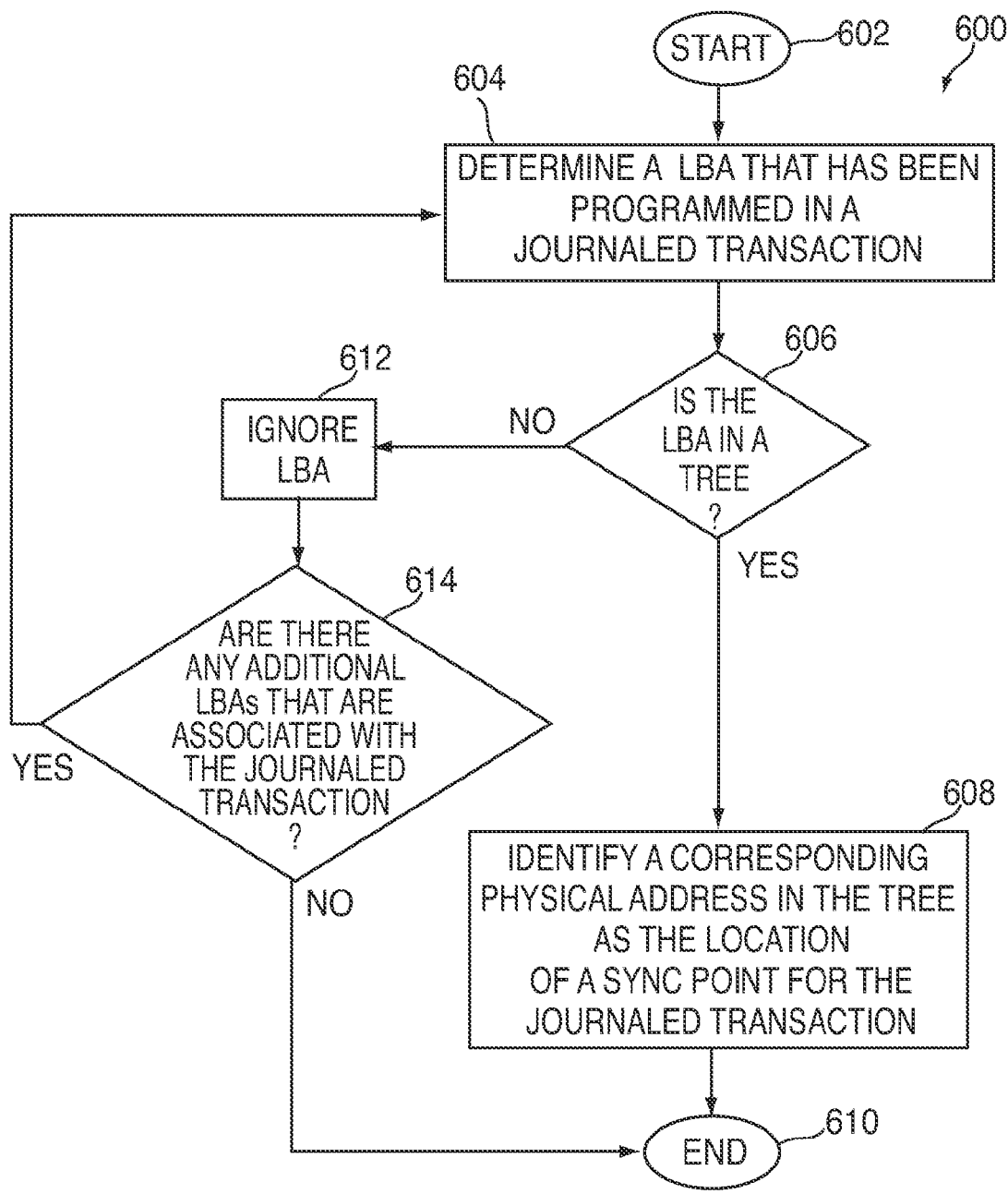
FIG. 6 shows a flowchart of an illustrative process for identifying sync points in accordance with an embodiment of the invention.

Referring now to FIGS. 4-6, flowcharts of illustrative processes 400, 500, and 600 are shown in accordance with various embodiments of the invention. Processes 400, 500, and 600 can be executed by a control circuitry (e.g., portions of a host controller and NVM interface 118 of FIG. 1 or NVM controller 122 of FIG. 1) or by any other component or combination of components of an electronic device or system (e.g., system 100 of FIG. 1).

Turning first to FIG. 4, process 400 may illustrate steps used to perform garbage collection ("GC") on a block or super block of a NVM (e.g., NVM 121 of FIG. 1). In particular, GC may be performed on one or more blocks or super blocks of the NVM when additional space needs to be made available on the NVM for programming. Thus, in order to free up space for reprogramming, data stored on the one or more blocks or super blocks can be erased.

Before performing GC on the NVM, the control circuitry may first need to verify that LBAs programmed in a journaled transaction will not be erased. That is, for a multi-page, multi-call transaction, older versions of LBAs that have been programmed in the journaled transaction may need to be retained such that the transaction can behave atomically. In some cases, in order to ensure atomicity of transactions, the control circuitry may delay erasing older versions of LBAs of a journaled transaction until after the transaction is complete.

Process 400 may start at step 402, where the control circuitry may determine that GC needs to be performed on a NVM. At step 404, the control circuitry can search a list of journaled transactions in order to identify which LBAs have been programmed in one or more journaled transactions. For example, based on the list of journaled transactions in Table 3, the control circuitry can determine that LBAs y and y* are still associated with a journaled transaction (e.g., TRANSACTION_ID 1).

Then, at step 406, the control circuitry can cross-check the LBAs stored in a block or super block with the LBAs that have been programmed in one or more journaled transactions. For example, the control circuitry can cross-check the LBAs stored in block 200 (FIG. 2A) with LBAs y and y*.

Continuing to step 408, the control circuitry can determine if there is a conflict. That is, the control circuitry can determine whether the block or super block includes LBAs that have been programmed in one or more journaled transactions. If, at step 408, the control circuitry determines that there is no conflict (e.g., the block or super block does not include LBAs that have been programmed in one or more journaled transactions), process 400 can move to step 410.

At step 410, the control circuitry can perform GC on the block or super block. Process 400 may then end at step 412.

Referring back to step 408, if the control circuitry instead determines that there is a conflict (e.g., the block or super block includes LBAs that have been programmed in one or more journaled transactions), process 400 can move to step 414. For example, for block 200, the control circuitry can determine that there is a conflict because block 200 has user data associated with LBA y (e.g., user data 210). As a result, the control circuitry can determine that GC is inappropriate for block 200.

At step 414, the control circuitry can select a new block or super block for GC. Process 400 may then return to step 406, where the control circuitry can cross-check the LBAs stored in the new block or super block with the LBAs that have been programmed in one or more journaled transactions.

Accordingly, in contrast to conventional approaches that erase data stored in a block when the block has been filled and no program failures have been detected (e.g., no uncorrectable error correction coding ("uECC") errors), this approach ensures that the system can roll back to known valid states (e.g., sync points) for one or more journaled transactions. As used herein, a "sync point" can refer to valid data states of LBAs associated with a transaction immediately prior to the start of that transaction.

For instance, in the example shown in FIGS. 2A-2C, user data 210 corresponds to a valid data state of LBA y immediately prior to the start of a transaction with TRANSACTION_ID 1. Thus, the memory locations of user data 210 and metadata 211 of block 200 (FIG. 2A) provide the locations of a sync point for LBA y.

As another example, because the transaction with TRANSACTION_ID 0 ended at time $t_3$, user data 242 (FIG. 2C) corresponds to a valid data state for LBA x. Thus, the memory locations of user data 242 and metadata 243 (FIG. 2C) provide the locations of a sync point for LBA x.

By preserving older versions of data associated with a transaction while a transaction is still pending, the system can roll back to the front of the transaction in case of device failure events. This way, the system can avoid a situation where the system is unable to roll back to a known valid state because older sync points have been erased during a GC process.

In addition, the coordination of sync points between the file system and the NVM can provide coherency from the perspective of an application or an operating system. In particular, for a system that only provides data roll back at the NVM level, the roll backs may still be incoherent from an application or operating system perspective.

For example, a particular file may have five different sectors, where user data associated with three sectors of the file may be stored on a first block that has been fully programmed. In addition, user data associated with two sectors of the file may be stored on a second block that is currently open. If a program failure was detected in a page of the second block, the system may roll back to that page in order to maintain time order consistency. However, this may in fact result in an inconsistent state from an application perspective because the file now includes two sectors with updated data and three sectors with data that have been rolled back to an older version.

Accordingly, by involving the file system and keeping track of individual transactions, a system can roll back an entire file or folder structure to a consistent state from an application or operating system perspective. This consistent data roll back can be ensured even when data associated with a single transaction are stored on multiple blocks.

Referring now to FIG. 5, a flowchart of illustrative process 500 is shown for rolling back a transaction to a sync point. Process 500 may begin at step 502, where a device may be booted up after a device failure event. A device failure event can include, for example, a power failure event or a system crash. At step 504, a control circuitry can detect that a device failure event has occurred.

At step 506, in response to detecting that a device failure event has occurred, the control circuitry can identify one or more journaled transactions. For example, the control circuitry can search a list of journaled transactions, and determine LBAs corresponding to each journaled transaction using the list of journaled transactions.

For instance, based on the list of journaled transactions shown in Table 3, the control circuitry can determine that there is currently one journaled transaction (e.g., TRANSACTION_ID 1), and that LBAs y and y* correspond to the journaled transaction.

Continuing to step 508, the control circuitry can locate a sync point for each of the one or more journaled transactions. Any suitable approach can be used to locate a sync point. In some embodiments, the control circuitry can search for the physical address of the oldest data in the NVM that is associated with each of the one or more journaled transactions. The oldest data may be determined by comparing corresponding age metadata stored on one or more blocks or super blocks (e.g., by comparing ages 214 (FIG. 2A), 232 (FIG. 2B), and 252 (FIG. 2C)).

For instance, for TRANSACTION_ID 1, the oldest data associated with the transaction is located on block 200 (e.g., user data 210 has an age of n−1). The location of the sync point can therefore be identified as the corresponding physical addresses of user data 210 and metadata 211 in block 200.

In other embodiments, the control circuitry can search a tree that is maintained and stored in the system such as, for example, in volatile memory or non-volatile memory (e.g., NVM 121 of FIG. 1). The tree can include any suitable tree structure for storing logical to physical address mappings.

In some cases, the logical to physical address mappings of the tree can be updated only once a transaction has ended. Thus, by searching the tree for LBAs associated with a journaled transaction, the control circuitry can locate a proper sync point for that transaction (e.g., the physical location of LBAs associated with the journaled transaction immediately prior to the start of the transaction).

At step 510, the control circuitry can roll back each of the one or more journaled transactions to the corresponding sync point in a NVM (e.g., NVM 121 of FIG. 1). That is, the control circuitry can discard any data programmed during the one or more journaled transactions, and revert back to valid data states prior to the start of the transactions. Process 500 may end at step 512.

Turning now to FIG. 6, a flowchart of illustrative process 600 is shown for locating a sync point for a journaled transaction. In some embodiments, process 600 may represent a more detailed view of locating step 508 of process 500 (FIG. 5).

Process 600 may start at step 602. At step 604, control circuitry can determine a LBA that has been programmed in a journaled transaction (e.g., a journaled transaction such as TRANSACTION_ID 1). For example, the control circuitry can determine the LBA by searching a list of journaled transactions.

Then, at step 606, the control circuitry can determine whether the LBA is in a tree. If the control circuitry determines that the LBA is in the tree, process 600 may move to step 608.

For instance, based on the list of journaled transactions shown in Table 3, the control circuitry can determine that LBA y is associated with TRANSACTION_ID 1, and that LBA y is listed in the tree. This can be an indication that a file or folder structure is being updated in place. Moreover, because TRANSACTION_ID 1 has not yet ended, the tree includes the physical address of the valid user data for LBA y.

At step 608, the control circuitry can identify a corresponding physical address in the tree as the location of a sync point for the journaled transaction. For example, for LBA y, the control circuitry can find the location of the sync point based on the physical address stored in the tree that maps to LBA y. Process 600 may then end at step 610.

Referring back to step 606, if the control circuitry instead determines that the LBA is not in the tree, process 600 may move to step 612. This may be in an indication that the LBA is a new LBA that has been programmed during a journaled transaction, and is therefore not a sync point for the journaled transaction. For instance, based on the list of journaled transactions shown in Table 3, the control circuitry can determine that LBA y* is associated with TRANSACTION_ID 1, but that LBA y* is not listed in the tree.

At step 612, the control circuitry can ignore the LBA. Then, at step 614, the control circuitry can determine whether there are any additional LBAs that are associated with the journaled transaction. If, at step 614, the control circuitry determines that there are additional LBAs that are associated with the journaled transactions, process 600 may return to step 604, where the control circuitry can determine another LBA that has been programmed in the journaled transaction.

If, at step 614, the control circuitry instead determines that there are not any additional LBAs that are associated with the journaled transactions, process 600 may end at step 610.

In some embodiments, control circuitry (e.g., portions of a host controller and NVM interface 118 of FIG. 1 or NVM controller 122 of FIG. 1) can distinguish between journaled and non-journaled transactions using one or more markers stored in the NVM. In particular, the control circuitry can program one or more pages of a block with a marked or unmarked value indicating whether a transaction is journaled or non-journaled.

Referring now to FIGS. 7A-7D, graphical views of four blocks (e.g., blocks 700, 720, 740, and 760) of a NVM (e.g., NVM 121 of FIG. 1) are shown at various stages of a transaction. Persons skilled in the art will appreciate that the memory locations where the user data and metadata are stored in blocks 700, 720, 740, and 760 are merely illustrative. For example, in some embodiments, user data and corresponding metadata may be stored in the same memory locations (e.g., pages) of a block. In other embodiments, user data and corresponding metadata may be stored in different blocks. Persons skilled in the art will also appreciate that other types of metadata can also be stored in blocks 700, 720, 740, and 760.

Figure 7B:
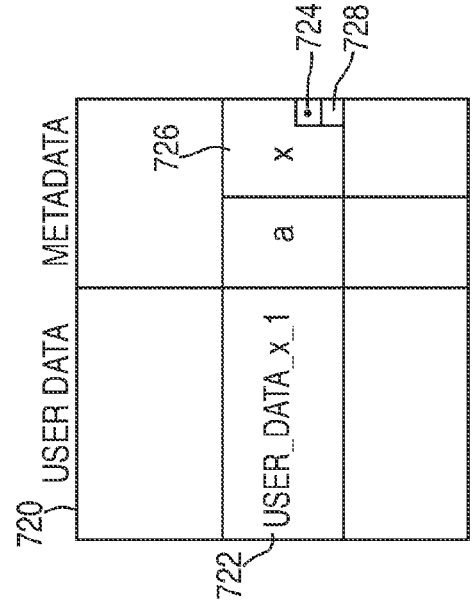
FIG. 7 shows graphical views of four blocks shown at various stages of a transaction in accordance with embodiments of the invention.
Figure 7D:
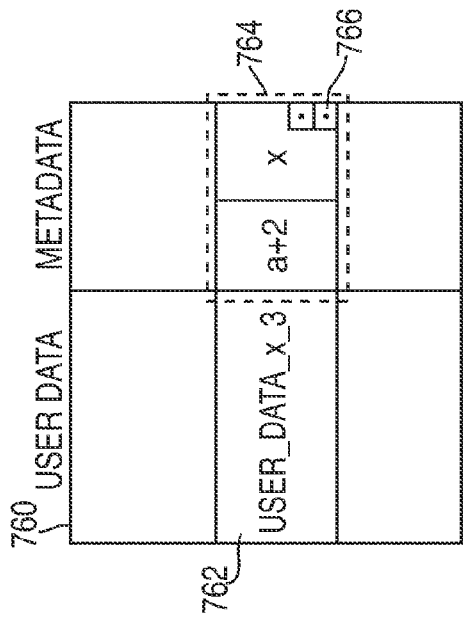
Figure 7A:
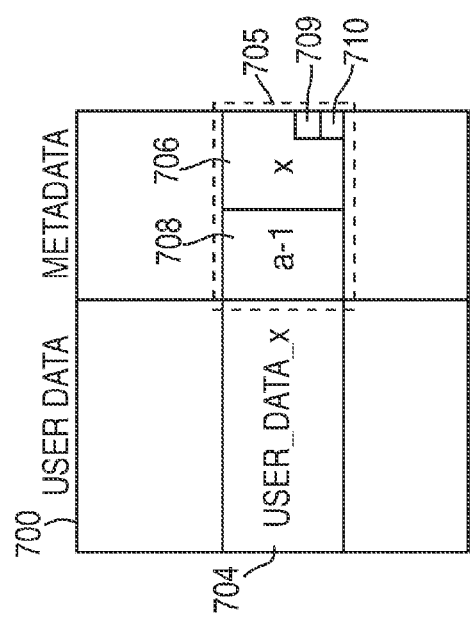

Turning now specifically to FIG. 7A, the physical address corresponding to user data 704 may correspond to a valid data states for a transaction prior to the start of that transaction. Metadata 705 may include LBA metadata (e.g., LBA metadata 706) and age metadata (e.g., age metadata 708).

In addition, metadata 705 may include one or more markers indicating whether user data 704 is associated with a journaled transaction. In some embodiments, for example, one or more pages of metadata 705 may include a transaction ID marker associated with the user data. For example, if user data 704 is associated with a pending transaction with TRANSACTION_ID 0, the transaction ID marker may have a value of 0.

In other embodiments, because the amount of bit space available for transaction IDs may be limited, and because transactions IDs may be recycled after a period of time, the metadata can instead include a BEGIN transaction marker and an END transaction marker. BEGIN and END transaction markers may be programmed in any suitable manner. For example, BEGIN and END transaction markers may be embedded in the metadata of the first and last pages of a transaction. As another example, BEGIN and END transaction markers can be programmed in separate metadata pages.

As shown in FIG. 7A, for instance, metadata 705 can include BEGIN transaction marker 709 and END transaction marker 710. Each of the markers can provide journaling information regarding a particular transaction. For example, the value of BEGIN transaction marker 709 can provide an indication of whether a particular transaction is a journaled transaction (e.g., BEGIN transaction marker 709 has a marked valued) or a non-journaled transaction (e.g., BEGIN transaction marker 709 has an unmarked valued). In some embodiments, BEGIN and END transaction markers may have initial unmarked values prior to the start of a transaction.

Referring now to FIG. 7B, once a new transaction begins, a BEGIN transaction marker associated with the transaction can be correspondingly updated. For instance, the control circuitry can receive a BEGIN_TRANSACTION command similar to the BEGIN_TRANSACTION command shown in (4). In addition, the control circuitry can receive a WRITE command similar to the WRITE command shown in (5).

In response to receiving these commands, the control circuitry can determine if the TRANSACTION_ID associated with the BEGIN_TRANSACTION command indicates that the transaction is a journaled transaction (e.g., TRANSACTION_ID has a non-default value). If the control circuitry determines that the transaction is a journaled transaction, the control circuitry can program an associated BEGIN transaction marker with a marked value. If the control circuitry instead determines that the transaction is a non-journaled transaction, the associated BEGIN transaction marker can be left unprogrammed with an unmarked value.

For instance, as shown in FIG. 7B, assuming that the transaction associated with LBA 726 is a journaled transaction, BEGIN transaction marker 724 can be programmed with a marked value. In addition, as mentioned above, the control circuitry can update a list of journaled transactions with the transaction (e.g., as shown in Table 1).

Figure 7C:
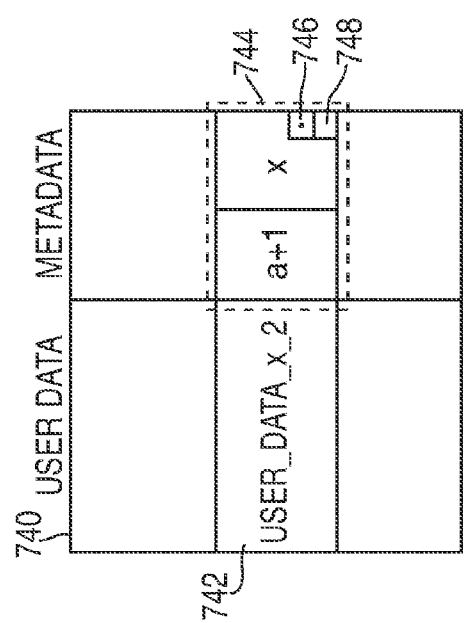

Turning now to FIG. 7C, the control circuitry can receive a WRITE command similar to the WRITE command shown in (8). In response to receiving the WRITE command, the control circuitry can program user data 742 and metadata 744 (e.g., including BEGIN transaction marker 746 and END transaction marker 748).

Accordingly, by maintaining one or more markers indicating which transactions are journaled, a control circuitry can perform garbage collection more efficiently. For example, because user data may only need to be rolled back to a sync point in the NVM, older versions of user data that have been programmed during a journaled transaction can be erased once an updated version has been programmed for the transaction.

Figure 8:
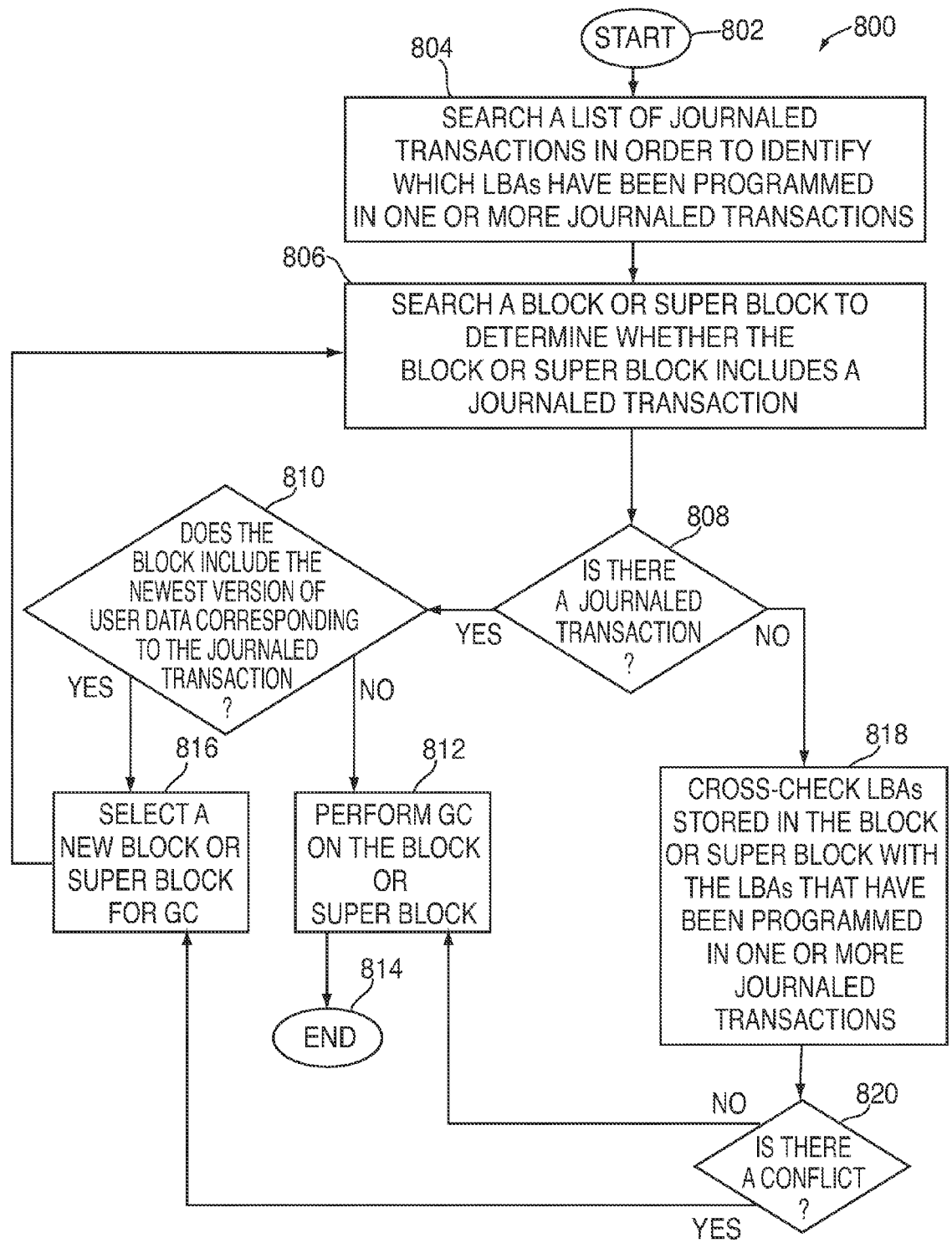
FIG. 8 shows a flowchart of another illustrative process for performing garbage collection on a non-volatile memory in accordance with an embodiment of the invention.

Referring now to FIG. 8, a flowchart of illustrative process 800 is shown for performing GC on a block or super block of a NVM (e.g., NVM 121 of FIG. 1) in accordance with various embodiments of the invention. Process 800 can be executed by a control circuitry (e.g., portions of a host controller and NVM interface 118 of FIG. 1 or NVM controller 122 of FIG. 1) or by any other component or combination of components of an electronic device or system (e.g., system 100 of FIG. 1).

Process 800 may start at step 802, where the control circuitry may determine that GC needs to be performed on the NVM. At step 804, the control circuitry can search a list of journaled transactions in order to identify which LBAs have been programmed in one or more journaled transactions. For example, based on the list of journaled transactions shown in Table 1, the control circuitry can determine that LBA x is associated with a journaled transaction (e.g., TRANSACTION_ID 0).

Continuing to step 806, the control circuitry can search a block or super block to determine whether the block or super block includes a journaled transaction. In some embodiments, the control circuitry can make this determination based at least in part on the list of journaled transactions and one or more markers stored on the block or super block. For example, the control circuitry can determine that the block or super block has a BEGIN transaction marker with a marked value and a corresponding END transaction marker with an unmarked value. Based on this determination, the control circuitry can determine LBAs associated with the markers based on metadata stored in the block or the super block. If at least a portion of the determined LBAs matches the LBAs obtained from the list of journaled transactions (e.g., LBAs that have been programmed in at least one journaled transaction), the control circuitry can determine that the block or super block includes a journaled transaction.

For instance, referring specifically to FIG. 7A-7C, for block 720 (FIG. 7B), the control circuitry can determine that BEGIN transaction marker 724 has a marked value, but END transaction marker 728 has an unmarked value. As another example, for block 740 (FIG. 7C), the control circuitry can determine that BEGIN transaction marker 746 has a marked value, but END transaction marker 748 has an unmarked value. Moreover, the control circuitry can determine that LBA x (obtained from the list of journaled transactions in Table 1) matches the LBA associated with both sets of BEGIN and END transaction markers.

If, at step 808, the control circuitry determines that the block or super block includes a journaled transaction, process 800 can move to step 810.

At step 810, the control circuitry can determine if the block or super block includes the newest version of user data corresponding to the journaled transaction. If, at step 810, the control circuitry determines that the block or super block does not include the newest version of user data corresponding to the journaled transaction, process 800 can move to step 812. That is, the block or super block may contain user data that are all outdated (e.g., the user data may correspond to older versions of more recently programmed user data). This may allow the control circuitry to perform GC on the block or super block even though the corresponding journaled transaction is still pending. For example, if the block under consideration is block 720 (FIG. 7B), the control circuitry can determine that there is a newer version of LBA x stored in block 740 (FIG. 7C).

At step 812, the control circuitry can perform GC on the block or super block. Process 800 may then end at step 814.

Referring back to step 810, if the control circuitry instead determines that the block or super block includes the newest version of user data corresponding to the journaled transaction, process 800 can move to step 816. For example, if the block under consideration is block 740 (FIG. 7C), the control circuitry can determine that the newest version of the LBA x is currently located in this block.

At step 816, the control circuitry can select a new block or super block for GC. Process 800 may then return to step 806, where the control circuitry can search another block or super block to determine whether the block or super block includes a journaled transaction.

Referring back to step 808, if the control circuitry instead determines that the block does not include a journaled transaction, process 800 can move to step 818. For example, the block under consideration may be block 700 of FIG. 7A. At step 818, the control circuitry can cross-check LBAs stored in the block or super block with the LBAs that have been programmed in one or more journaled transactions. For example, the control circuitry can cross-check the LBAs stored in block 700 with LBA x.

Continuing to step 820, the control circuitry can determine if there is a conflict. That is, the control circuitry can determine if the LBAs stored in the block or super block conflict with the LBAs that have been programmed in one or more journaled transactions. This may be an indication that the block or super block includes at least one sync point. As a result, the control circuitry needs to ensure that the block or super block is not erased during a GC process.

If, at step 820, the control circuitry determines that the LBAs stored in the block or super block do not conflict with the LBAs that have been programmed (e.g., the block or super block does not include LBAs that are associated with journaled transactions), process 800 can move to step 812. At step 812, the control circuitry can perform GC on the block or super block.

Referring back to step 820, if the control circuitry instead determines that the LBAs stored in the block or super block conflicts with the LBAs that have been programmed (e.g., the block or super block includes LBAs that are associated with journaled transactions), process 800 can move to step 816. For example, for block 700, the control circuitry can determine that there is a conflict because block 700 has LBAs associated with journaled transactions (e.g., LBA x). As a result, the control circuitry can determine that GC is inappropriate for block 700. Correspondingly, at step 816, the control circuitry can select a new block or super block for GC.

Turning now to FIG. 7D, the control circuitry can receive another WRITE command associated with TRANSACTION_ID 0. In response to receiving this WRITE command, the control circuitry can program user data 762 and metadata 764 in block 760. In addition, the control circuitry may receive an END_TRANSACTION command similar to the END_TRANSACTION command shown in (9).

In response to receiving the END_TRANSACTION command, the control circuitry can program END transaction marker 766 with a marked value, which can indicate that the transaction associated with LBA x has completed (e.g., TRANSACTION_ID 0). In addition, the control circuitry can update a list of journaled transactions by removing the entry associated with TRANSACTION_ID 0.

It should be understood that processes 300, 400, 500, 600, and 800 of FIGS. 3, 4, 5, 6 & 8 are merely illustrative. Any of the steps may be removed, modified, or combined, and any additional steps may be added, without departing from the scope of the invention.

The described embodiments of the invention are presented for the purpose of illustration and not of limitation.

What is claimed is:

1. A method for performing garbage collection ("GC") in an electronic device, the method comprising:
   determining that GC needs to be performed on a non-volatile memory ("NVM");
   searching a block of the NVM to determine whether the block includes a journaled transaction based at least in part on a list of journaled transactions and at least one marker stored on the block, wherein the searching the block comprises:
      searching the list of journaled transactions; and
      identifying which logical block addresses ("LBAs") have been programmed in at least one journaled transaction, wherein the LBAs correspond to addresses used by a file system to read and write data on the NVM; and
   in response to determining that the block includes a journaled transaction, performing GC on the block if the block does not include a newest version of user data corresponding to the journaled transaction.

2. The method of claim 1, further comprising selecting a new block for GC if the block includes the newest version of the user data corresponding to the journaled transaction.

3. The method of claim 1, wherein the at least one marker comprises a begin transaction marker and an end transaction marker.

4. The method of claim 3, wherein the searching the block further comprises:
   determining that the begin transaction marker has a marked value and the end transaction marker has an unmarked value;
   determining LBAs associated with the begin transaction marker and the end transaction marker.

5. The method of claim 4, further comprising determining that the block includes a journaled transaction if at least a portion of the determined LBAs matches the LBAs that have been programmed in the at least one journaled transaction.

6. The method of claim 1, further comprising:
   in response to determining that the block does not include a journaled transaction, cross checking LBAs stored in the block with the LBAs that have been programmed in the at least one journaled transaction;
   determining if the LBAs stored in the block conflict with the LBAs that have been programmed in the at least one journaled transaction; and
   in response to determining that the LBAs stored in the block conflicts with the LBAs that have been programmed, selecting a new block for GC.

7. The method of claim 6, further comprising in response to determining that the LBAs stored in the block do not conflict with the LBAs that have been programmed, performing GC on the block.

8. A system comprising:
   non-volatile memory ("NVM");
   control circuitry operative to manage the NVM; and
   a file system operative to:
      detect a current transaction on a file;
      assign a first transaction identification ("ID") to the current transaction;
      issue a begin transaction command associated with the current transaction to the control circuitry, wherein a parameter of the begin transaction command comprises the first transaction ID; and
      issue a write command associated with the current transaction to the control circuitry; and
   wherein the control circuitry is operative to store at least one logical block address ("LBA") in at least one memory location of the NVM, wherein the at least one LBA is used to identify user data associated with the current transaction.

9. The system of claim 8, wherein a parameter of the write command comprises the first transaction ID.

10. The system of claim 9, wherein the NVM comprises a plurality of blocks, and wherein the control circuitry is operative to program metadata to a block of the plurality of blocks, wherein the metadata comprises at least one marker indicating that the current transaction is a journaled transaction.

11. The system of claim 8, wherein the control circuitry is operative to maintain a list of journaled transactions, wherein each journaled transaction of the list of journaled transactions is associated with corresponding logical block addresses ("LBAs").

12. The system of claim 11, wherein the control circuitry is operative to add the first transaction ID and associated LBAs to the list of journaled transactions.

13. The system of claim 12, wherein the file system is operative to:
    detect an end of the current transaction; and
    issue an end transaction command associated with the current transaction to the control circuitry.

14. The system of claim 13, wherein control circuitry is operative to delete the first transaction ID and associated LBAs from the list of journaled transactions.

15. The system of claim 11, wherein the control circuitry is operative to:
    determine that garbage collection ("GC") needs to be performed;
    determine that a block of the NVM comprises LBAs that have been programmed in at least one journaled transaction of the list of journaled transactions; and
    select a new block for GC.

16. An electronic device comprising:
    a file system operative to handle multiple transactions;
    non-volatile memory ("NVM"); and
    control circuitry operative to:
        detect that a device failure event has occurred;
        identify at least one journaled transaction;
        locate a sync point for the at least one journaled transaction by identifying a physical address of at least one memory location of the NVM associated with the at least one journaled transaction; and
        roll back the at least one journaled transaction to the sync point in the NVM.

17. The electronic device of claim 16, wherein the file system comprises at least one of a File Allocation Table file system and a Hierarchical File System Plus.

18. The electronic device of claim 16, wherein the control circuitry is further operative to discard data programmed during the at least one journaled transaction.

19. The electronic device of claim 16, wherein the control circuitry is operative to search for the physical address of the oldest data in the NVM associated with the at least one journaled transaction.

20. The electronic device of claim 19, wherein the control circuitry is operative to search a list of journaled transactions.

21. The electronic device of claim 20, wherein the control circuitry is further operative to:
    determine logical block addresses ("LBAs") corresponding to the at least one journaled transaction using the list of journaled transactions; and
    compare corresponding age metadata stored on multiple blocks of the NVM.

22. The electronic device of claim 16, wherein the control circuitry is further operative to:
    search a tree comprising logical to physical address mappings; and
    locate the sync point using the tree.

23. The electronic device of claim 22, wherein the control circuitry is further operative to:
    determine a LBA that has been programmed in the at least one journaled transaction by searching a list of journaled transactions;
    determine whether the LBA is in the tree; and
    in response to determining that the LBA is in the tree, identify a corresponding physical address in the tree as the physical address of the sync point.

24. The electronic device of claim 23, wherein in response to determining that the LBA is not in the tree, the control circuitry is further operative to ignore the LBA.

* * * * *